United States Patent [19]

Rich et al.

[11] 4,224,618
[45] Sep. 23, 1980

[54] RADAR SYSTEM WITH A MULTIPLICITY OF ANTENNA BEAMS FOR ELEVATION COVERAGE

[75] Inventors: Lewis C. Rich, Jamaica; Julius V. DiFranco, Dix Hills; Robert J. Timms, Glen Head, all of N.Y.

[73] Assignee: Sperry Corporation, New York, N.Y.

[21] Appl. No.: 968,243

[22] Filed: Dec. 11, 1978

[51] Int. Cl.² .............................................. G01S 7/20
[52] U.S. Cl. ................................ 343/5 EM; 343/6 R; 343/7.9
[58] Field of Search .................... 343/5 EM, 6 R, 7.9, 343/16 R

[56] References Cited

U.S. PATENT DOCUMENTS

| 3,182,309 | 5/1965 | Hendry et al. | 343/5 EM |
| 3,328,797 | 6/1967 | Jorna et al. | 343/6 R X |
| 3,618,086 | 11/1971 | van Staaden et al. | 343/6 R X |
| 4,158,840 | 6/1979 | Schwab | 343/6 R |

Primary Examiner—T. H. Tubbesing
Attorney, Agent, or Firm—Howard P. Terry; Seymour Levine

[57] ABSTRACT

A radar system is disclosed which provides comprehensive radar elevation surveillance with a multiplicity of antennas, each of which supplies a fraction of the total elevation coverage. Each antenna provides a relatively narrow elevation radiation pattern which illuminates adjacent elevation sectors. The video derived from received radar echoes by all the antennas are sector identified and displayed on a single radar presentation.

6 Claims, 10 Drawing Figures

RADAR SYSTEM WITH A MULTIPLICITY OF ANTENNA BEAMS FOR ELEVATION COVERAGE

BACKGROUND OF THE INVENTION

1. Field of the Invention

The subject invention pertains to the art of radar surveillance systems and more particularly to a radar surveillance system which provides target information in three dimensions.

2. Description of the Prior Art

Ground to air radar surveillance systems which require only range and azimuth information may be realized by continuously rotating a fan beam antenna which provides a narrow azimuth beam width and a broad elevation beam width. These systems are capable of locating the range and azimuth coordinates of the detected target to an accuracy which is determined by the transmitted pulse width and the antenna azimuth beam width. The antenna's broad elevation beam width precludes the determination of a target's elevation coordinate to within any useful tolerance. To provide reasonable three coordinate information (3-D) modifications to the system and antennas are required.

One modification to fan beam surveillance systems to accomplish 3-D target location reduces the observation of elevation angle to a double observation of azimuth angle. In this system, a first azimuth observation is made by vertical fan beam and the second observation is made by a beam slanted to form a 45° V-shaped trough with the first. The target's elevation is then determined from the measured range and the azimuth rotation of the antenna between the first and second azimuth observations.

Other systems have been devised to provide 3-D coverage without the complexity of the V-beam system. In these systems, the fan beam antenna is replaced with a pencil beam antenna which has narrow azimuth and elevation beam width characteristics. Scanning this pencil beam in azimuth and elevation provides the capability of determining the elevation coordinate. This two-dimensional scanning is accomplished by scanning the antenna in elevation while continuously rotating it in azimuth, thus creating an over-all spiral scan. To provide the elevation information with these systems, the azimuthal rotation rate of the system must be decreased by a factor that is a function of the number of elevation beam positions desired, thus significantly reducing the over-all data rate of the system.

Elevation information may be obtained without a data rate reduction by stacking a number of pencil beams in elevation, to each of which there is a corresponding receiver and noting the beam in which the target is detected. In these systems, each beam may be the antenna pattern of an independent monostatic radar system or a separate broad coverage fan beam may be utilized to illuminate the area with each of the stacked beams utilized for reception only. Another method for obtaining a 3-D target information is to employ a multibeam electronically scanned antenna wherein each beam may be independently controlled. These systems, however, provide only limited azimuthal sector coverage and three or four may be required to give the elevation coverage desired over a full 360° azimuth coverage.

Surveillance systems heretofore described are extremely complex and generally inefficiently utilize the available radiation power. It is the object of the present invention to provide a 3-D system with a complete 360° azimuth coverage, that exhibits high radiation efficiency with a minimum of system complexity.

SUMMARY OF THE INVENTION

The present invention relates to a method of providing target elevation data in a radar surveillance system. A multiplicity of narrow elevation beam width antennas are positioned such that each scans in elevation within a predetermined one of adjacent elevation sectors which in total comprise the elevation coverage desired. Positioning of the antennas may be implemented in various manners. In one positioning implementation, the antennas are separately mounted with all antennas aligned in azimuth and rotated in synchronism. For this arrangement, radar video resulting from echoes received within each elevation sector are processed to provide an elevation sector identification symbol which is displayed at the range-azimuth coordinate on the radar indicator.

In another more compact positioning implementation, two antennas are mounted back-to-back with each positioned in elevation to respectively scan adjacent elevation sectors. Sector identification for this implementation is similar to the sector identification previously described. To provide a synchronous display on the radar indicator, however, with this implementation, the radar video resulting from an echo received by one of the two back-to-back antennas is delayed by a time equal to that required from 180° azimuth rotation of the antenna assembly. Additional antennas may be mounted, with uniform angular spacing therebetween, on one bearing mount to provide increased elevation coverage or an increased data rate. In these situations, the video time delay is equal to the time required for 360°/n azimuth rotation of the antenna assembly.

Combinations of separately and back-to-back mounted antennas may be employed with each antenna providing coverage of one elevation sector within the over-all elevation coverage of the system. In all antenna positioning implementations, target returns in an elevation sector are identified as described previously and the elevation angle of the detected target may be displayed adjacent to the sector identification symbol to provide three-dimensional target data.

The invention will be more clearly understood from the following description and from the accompanying drawings which illustrate, as non-limitative examples, preferred embodiments thereof.

DESCRIPTION OF THE PREFERRED EMBODIMENTS

Figure 1:
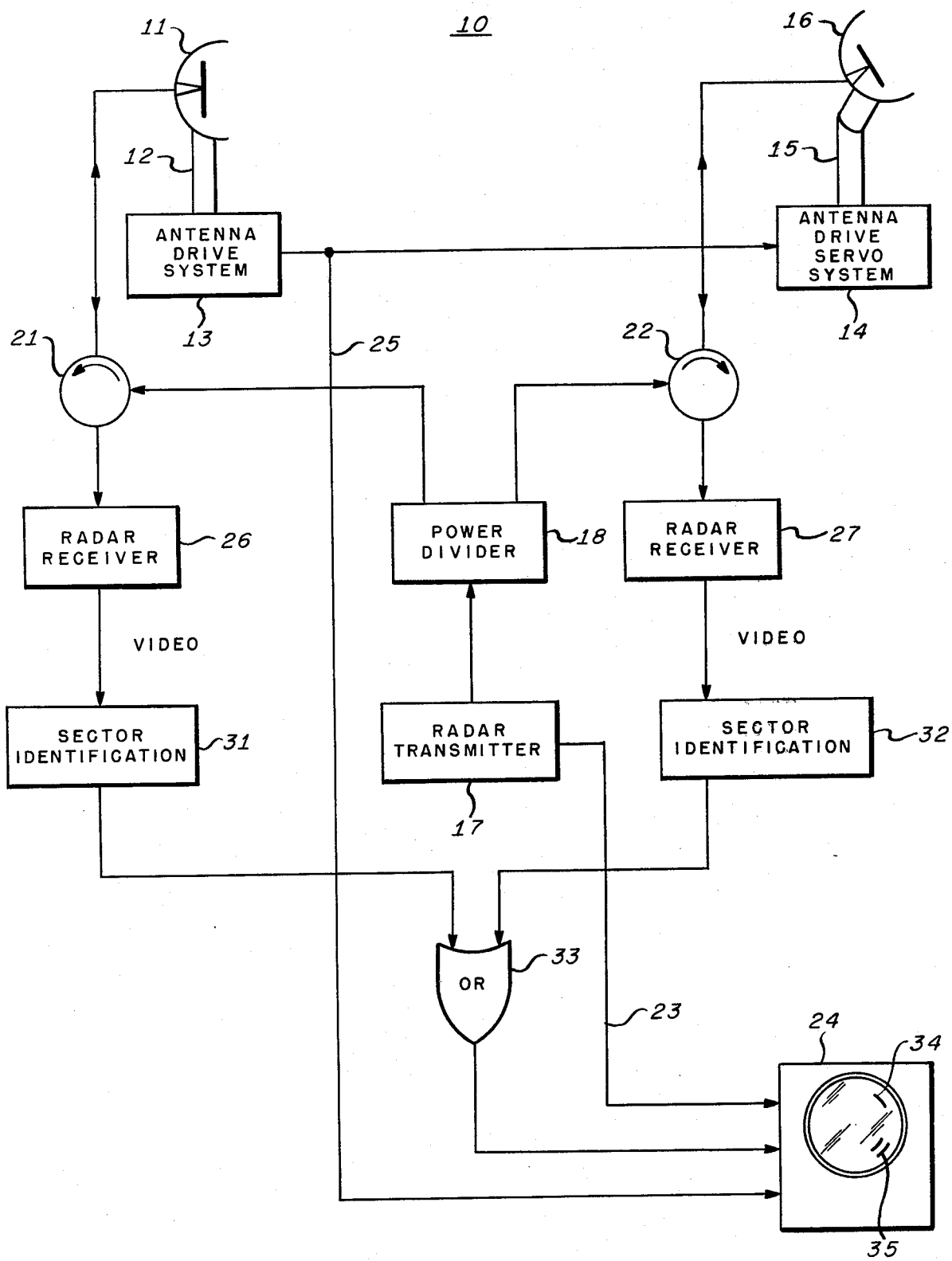
FIG. 1 is a block diagram of an embodiment of the invention wherein sector scanning antennas are separately mounted.

Referring now to the drawings, wherein repeated elements retain the original reference numerals, there is shown in FIG. 1 a radar system 10 which includes an antenna 11 elevation scannably mounted on a bearing mount 12 and azimuthally rotating therewith, elevation scanning and azimuthal rotation power being supplied by antenna drive system 13. As the antenna drive system 13 causes the bearing mount 12 to rotate, it provides an azimuthal signal to antenna drive servo 14 which causes the antenna bearing mount 15 to rotate azimuthally in synchronism with antenna bearing mount 12. An antenna 16 elevation scannably mounted on the bearing mount 15 azimuthally rotates therewith and is driven in elevation by the antenna drive servosystem 14. The antennas 11 and 16 are positioned on the bearing mounts 12 and 15, respectively, to scan adjacent elevation sectors, as for example, antenna 11 may scan from 0° to 10° while antenna 16 may scan from 10° to 20°. Since antennas 11 and 16 scan the assigned elevation sectors each may radiate with narrow elevation and azimuth radiation patterns, rather than with a broad elevation and narrow azimuth pattern. This narrow elevation radiation pattern provides finer angular resolution in elevation and greater over-all antenna gain. Additionally, the narrow elevation radiation pattern reduces surfce illumination and susceptibility to interfering sources, thus improving the signal-to-clutter and signal-to-interference ratios of the system.

A radar transmitter 17 couples pulsed RF energy through a power divider 18 and circulators 21 and 22 for transmission through the antennas 11 and 16, respectively. The power divisions accomplished by power divider 18 need not be equal. Since target detection at the higher elevation angles are generally at shorter ranges than target detection at the lower elevation angles, the power split should be apportioned accordingly. With the transmission of each radio frequency pulse, radar transmitter 17 couples a range sweep initiation pulse via lead 23 and antenna drive system 13 couples azimuth positioning signals via lead 25 to a radar indicator 24, which may be a PPI type display. Radar returns from an illuminated target received by antennas 11 and 16 are coupled through circulators 21 and 22 to receivers 26 and 27 respectively. Video signals from radar receivers 26 and 27 are coupled to sector identification circuits 31 and 32 wherein source identification signals are generated which signify the elevation sector in which the initial radar echoes were received, the resulting signals being coupled through OR gate 33 to the radar indicator 24 for display. These signals when displayed may comprise, for example, a single bar 34 indicating a radar return received by antenna 11 and a double bar 35 indicating a radar return received by antenna 16.

Figure 2:
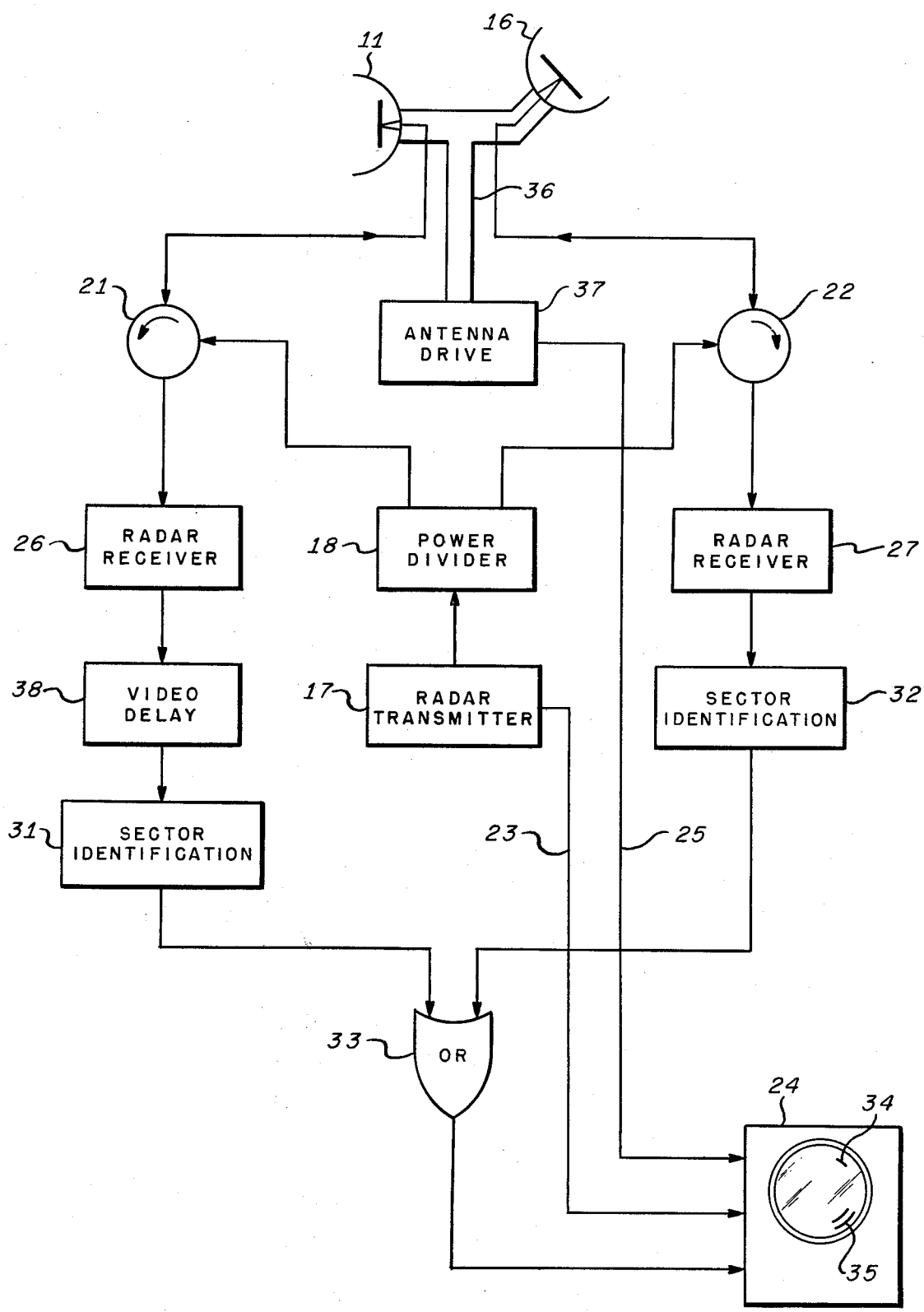
FIG. 2 is a block diagram of an embodiment of the invention wherein sector scanning antennas are mounted back-to-back on a commonly azimuthally rotating shaft.

In FIG. 2, a second embodiment of the invention is shown wherein antennas 11 and 16 are rigidly mounted back-to-back on the same bearing mount 36 which is rotatably driven by an antenna drive system 37. Antennas 11 and 16 are elevation scannably mounted on bearing mast 36 and are scannably driven by antenna drive system 37 to provide the elevation sector coverage previously discussed. Since antennas 11 and 16 are rotationally 180° out-of-phase, it is necessary to delay the signal received by one of the antennas, as for example, antenna 11, in order to provide the proper relative azimuthal positioning of the elevation sector identification signals on the radar display. As previously described, radar transmitter 17 couples energy to antennas 11 and 16 for radiation therefrom through power divider 18 and circulators 21 and 22, respectively. Radar echoes received by antenna 16 are coupled through circulator 22 to radar receiver 27, the video output of which is coupled to sector identification generator 32 wherefrom identification signals for display are coupled to OR gate 33, the output of which is coupled to radar display 24 whereon the sector identification signals indicating that a radar return has been received in the identified elevation sector are displayed. Radar echoes received by antenna 11 are coupled through circulator 21 to radar receiver 26 wherefrom video signals are coupled to video delay circuit 38 wherein they experience a time delay equal to the time required for 180° rotation of the antenna bearing mount 36. This delay synchronizes the presentation of the sector identification signals such that they are displayed with the proper relative azimuthal positioning. It will be recognized by those skilled in the art that additional antennas may be positioned on the bearing mount 36 for each of which a sector identification symbol and an appropriate delay of the video derived from target echoes received would provide an identifiable synchronized target position on the display 24.

Figure 3:
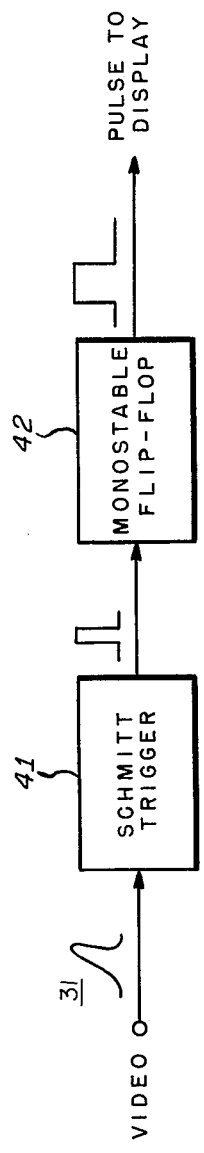
FIG. 3 is a block diagram of a sector identification signal generator.
Figure 4:
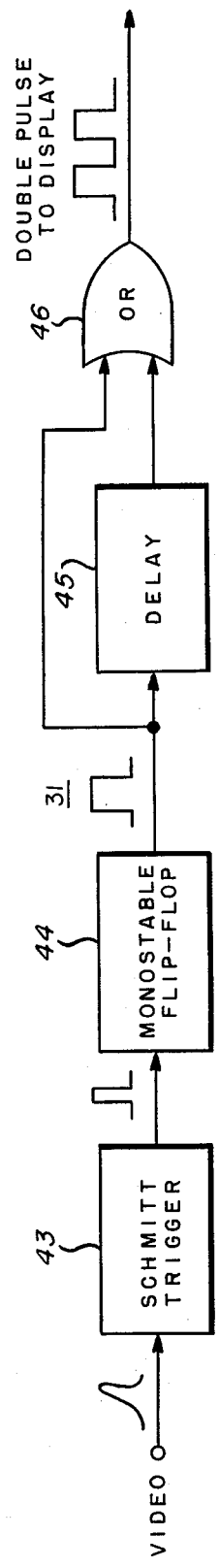
FIG. 4 is a block diagram of a sector identification signal generator differing from that of FIG. 3.

Refer now to FIG. 3 wherein is shown a block diagram of a triggered pulse generator which may be utilized as a sector identification symbol generator. A video signal derived from a received echo pulse is coupled to a Schmitt trigger 41 which as a result thereof couples a trigger pulse to a monostable flip-flop 42 which in turn generates a pulse which is coupled to the radar display unit to provide a target indication, the radial width of which is proportional to the pulse width of the pulse at the output terminal of the monostable flip-flop 42. A block diagram of another circuit suitable for utilization as a sector identification symbol generator is shown in FIG. 4. A video pulse coupled to a Schmitt trigger 43 causes a trigger pulse to be coupled to monostable flip-flop 44 wherefrom a pulse of suitable length is coupled to a delay line 45 and to one input terminal of an OR gate 46. The monostable flip-flop pulse which has been delayed on the delay line for an interval that is greater than the pulse length is coupled from the output terminal of delay line 45 to the second input terminal of OR gate 46 causing a pulse doublet to be coupled from the output terminal thereof to the radar display. This pulse doublet is displayed on the radar display 24 as a double video indication at the azimuthal position of the target, the radar echo of which gave rise to the video signal coupled to the Schmitt trigger.

Figure 5:
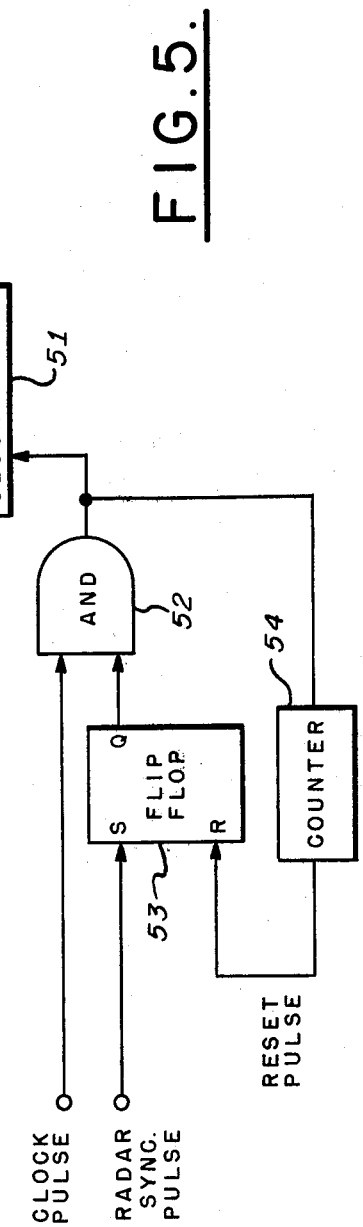
FIG. 5 is a block diagram of a video delay circuit suitable for use as the video delay shown in FIG. 2.

Refer now to FIG. 5 wherein a block diagram of a circuit suitable for utilization as the video delay circuit 38 of FIG. 2 is shown. Video signals from the radar receiver are coupled to the input terminals of a shift register 51, the clock input terminal of which is coupled to the output terminal of AND gate 52. One input terminal of AND gate 52 is coupled to receive clock pulses from a clock not shown and the other input terminal is coupled to the Q output terminal of an R-S flip-flop 53, the S input of which is coupled to receive the radar synch pulse from the radar transmitter 17 and the R input terminal is coupled to the output terminal of a counter 54, the input terminal of which is coupled to the output terminal of AND gate 52. The number of stages (N) in the shift register 51 is a function of the number of range bins in a range sweep (n), the pulse repetition rate (PRF) of the radar transmitter, and the period of azimuthal rotation (T) of the antenna and is given by the formula $N = n \times PRF \times T/2$. With each radar synch pulse applied to the S terminal of flip-flop 53, a high level signal is coupled therefrom to enable AND gate 52 such that with each clock pulse coupled to AND gate 52, a clock pulse is coupled from the output terminal of AND gate 52 to clock the shift register 51. The period of the clock pulses coupled to AND gate 52 is a function of the length of the range bins within the range sweep. As, for example, a 250 KHz clock has a period of 4 microseconds which corresponds to a range bin of 600 meters. While AND gate 52 is enabled, each clock pulse appearing at the output terminal thereof is coupled to the input terminal of counter 54. Counter 54 provides a pulse to the R terminal of R-S flip-flop 53 after the number of clock pulses which correspond to a complete range sweep have been received, thereby resetting the flip-flop prior to the receipt of the next radar synch pulse. When a video pulse has been clocked through the shift register 51 and appears at the output terminals thereof, it is coupled to the sector identification circuit for subsequent displays as previously described.

Figure 6:
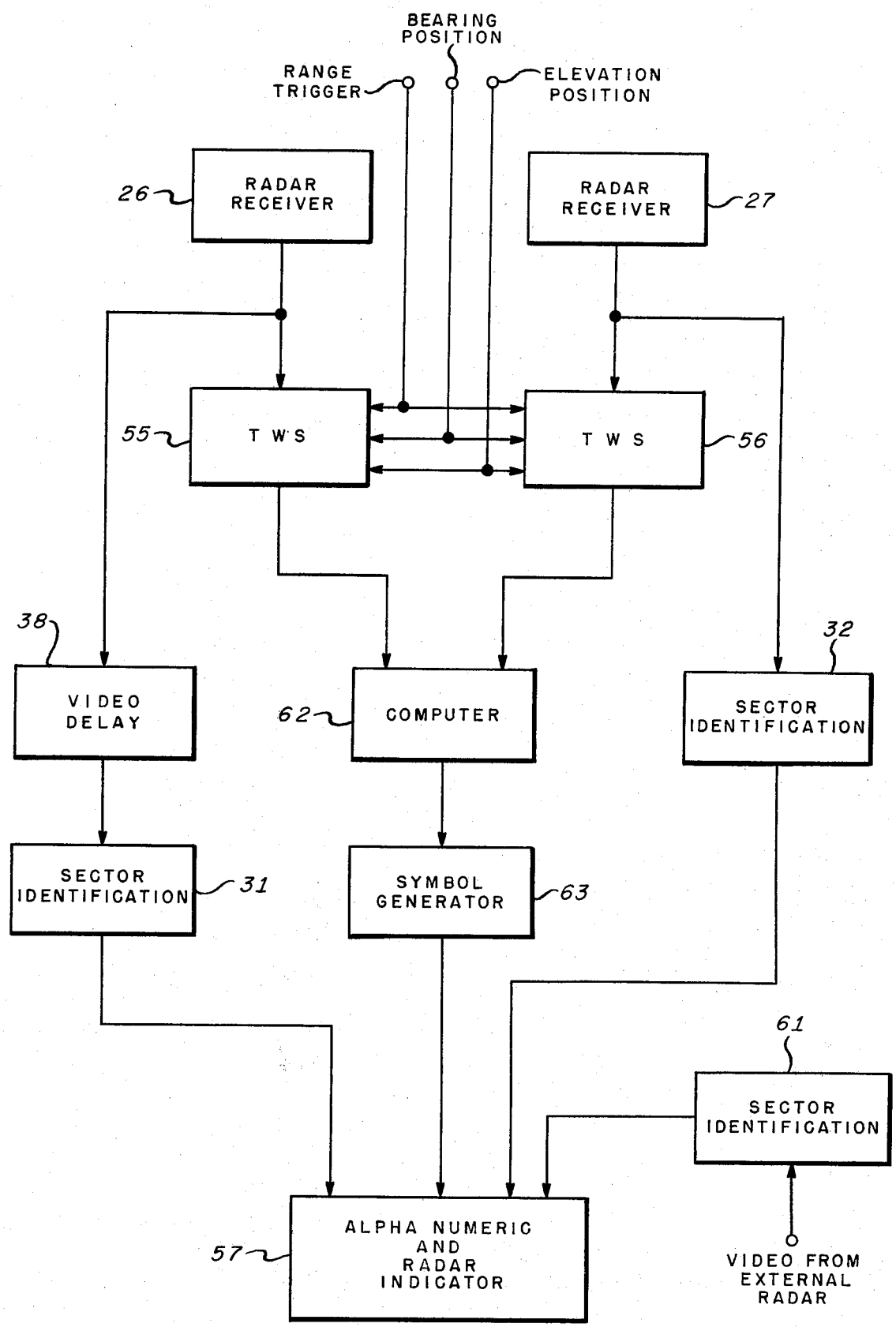
FIG. 6 is a block diagram of an embodiment of the invention incorporating track-while-scan circuitry.

Since each antenna scans a relatively narrow beam within its elevation sector, target elevation information may be achieved with much greater accuracy than the simple elevation sector designation. This increased accuracy may be achieved with well known techniques such as, for example, a track-while-scan (TWS) system, a block diagram of which is shown in FIG. 6. Video signals from receivers 26 and 27 are coupled respectively to TWS units 55 and 56, to which are also coupled range trigger pulses from the radar transmitter 17 and bearing and elevation position signals from the antenna drive system 37. The video signals coupled to TWS unit 55 are also coupled to video delay circuit 38 and after undergoing a delay, as previously described, are coupled to alphanumeric and radar indicator 57 via sector identification circuit 31. The video signals coupled to TWS unit 56 may also be coupled to sector identification circuit 32 wherefrom sector identified video is coupled to the alphanumeric and radar indicator 57. Radar information from an external radar with antennas mounted on independent bearing mounts may also be displayed on the alphanumeric and radar indicator 57 by coupling video from the external radar receivers to sector identification generators 61 wherefrom sector identified video for the external radars are coupled to the alphanumeric and radar indicator 57. All targets represented by video from radar receivers 26 and 27 and the external radar receiver are displayed on alphanumeric and radar indicator 57. As an antenna sweeps past a target in bearing, the TWS processors 55 and 56 determine the centroid of the target in bearing and range, the generation of which will be explained subsequently. When these centroids are determined, the elevation angle of the peak of the antenna beam is registered, thus providing an elevation beam center corresponding to the bearing and range centroids resolved by the TWS processor. Range, elevation, and azimuth data are coupled from the TWS processors 55 and 56 to a computer 62 wherein symbol designations for each target to be tracked are assigned and target tracks are maintained. Target position information and assigned target tracking symbol data are coupled from the computer 62 to symbol generator 63 wherefrom target position information with an associated identifying symbol are coupled to alphanumeric and radar indicator 57 whereon range and bearing positions may be determined from the target's location on the display and elevation information may be provided alphanumerically.

Figure 7:
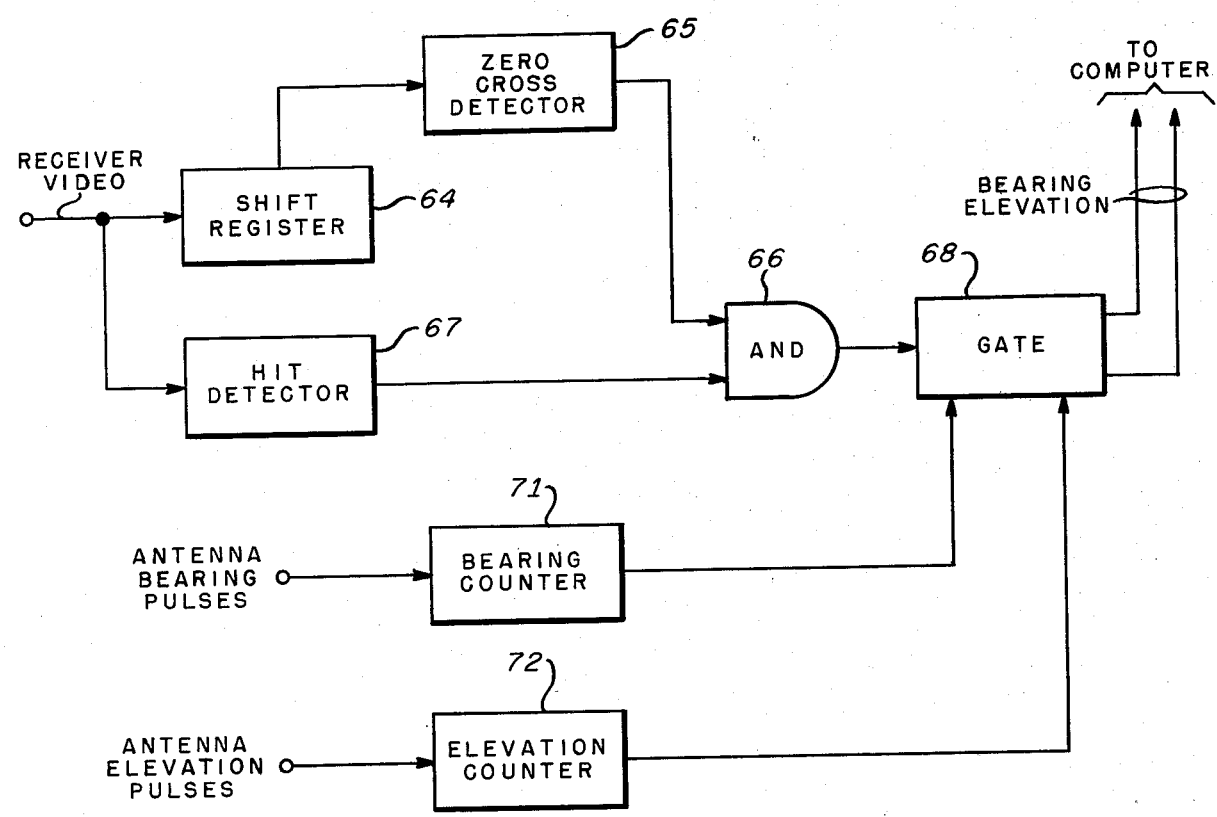
FIG. 7 is a block diagram of a circuit suitable for use with the track-while-scan unit shown in FIG. 6.
Figure 8A:
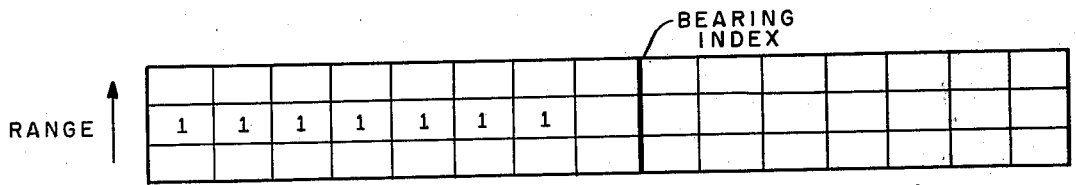
FIGS. 8A through 8C are representations of shift register entries useful to explain the operation of the circuit of FIG. 7.
Figure 8B:
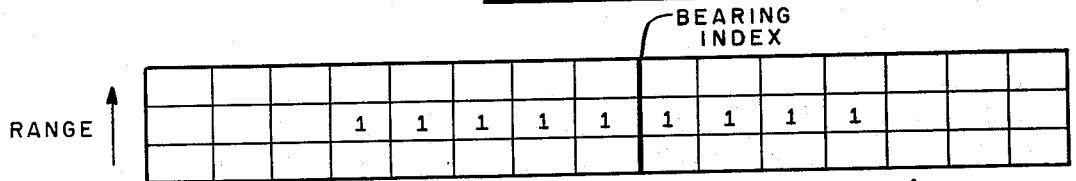
Figure 8C:
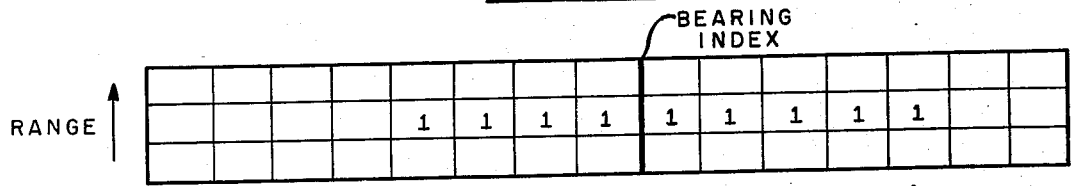

A block diagram of a circuit which may be employed for determining target position centroids during TWS operation is shown in FIG. 7. The operation for determining a range centroid is similar to that for determining an azimuth centroid. Consequently, for simplicity and brevity of explanation, the operation of the circuit will be described for the determination of the bearing centroid only. To aid in this description, reference will be made to FIGS. 8A, 8B and 8C. In FIG. 7, video received by a TWS processor is coupled to the input terminal of a shift register 64, wherein each stage corresponds to a bearing angle resolution cell. The received video data is shifted into the register at a rate corresponding to the angular rotation rate of the bearing mount. As each angular resolution cell of the beam sweeps by a target, a target indication is entered into the shift register and shifted from stage to stage as the antenna continues to rotate. FIG. 8A is a representation of the entries in the shift register for a radar that is expected to receive nine bits as it scans past a target but for which the peak of the beam, as represented by the bearing index in the figure, is not as yet at the target's angular position. Each stage in the register is tapped and the entry to the left and to the right of the bearing index are summed separately and their difference determined in zero crossover detector 65. If, for example, the sum to the left of the bearing index is subtracted from the sum to the right of the bearing index, the entries in FIG. 8A would provide a negative result. As the antenna continues to scan past the target, the entries in the register will shift as indicated in FIGS. 8B and 8C. When the result of the subtraction changes from a negative to a positive result, as it would be between the entries in FIGS. 8B and 8C, the zero cross detector 65 will couple a pulse to an input terminal of AND gate 66. To reduce the number of false alarms in this system, the received video is also coupled to a hit detector 67 which may be an N out of M detector (where N represents the received pulses out of M transmitted pulses) well known in the art. If a sufficient number of hits are detected by the hit detector 67, it couples an enabling signal to AND gate 66, thus permitting the centroid pulse from the zero crossing detector to enable gate 68. As the antenna scans in azimuth and elevation, bearing pulses indicative of its bearing position and elevation pulses indicative of its elevation position are coupled from the antenna drive system to bearing counter 71 and elevation counter 72, respectively. The bearing and elevation counts are coupled to gate 68 and are coupled therefrom to the computer 62 of FIG. 6 at the reception of the bearing centroid pulse from AND gate 66. As stated previously, a similar circuit may be provided in the TWS processor to determine the target range.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. In a radar system of the type including a multiplicity of antennas mounted for elevation scanning and azimuthal rotation, transmitter means and receiver means coupled thereto, and radar indicator means coupled to said receiver means, the improvement which comprises:

means coupled to receive video signals from said receiver means for generating identification signals to identify video signals derived from target echo signals received by each of said multiplicity of antennas:

means for coupling said identification signals generated by said identification generator means to said radar indicator means whereon video representative of echo signals received by each of said multiplicity of antennas are displayed and identified; and synchronizing means coupled to receive video signals and to generate therefrom video signals for affecting video displays consistent with the temporal azimuthal angular displacement between antennas of said multiplicity of antennas.

2. A radar system in accordance with claim 1 wherein each of said multiplicity of antennas is assigned to scan an elevation sector within the total elevation angular coverage of said radar system.

3. A radar system in accordance with claim 2 wherein an assigned elevation sector of one of said multiplicity of antennas abuts as assigned elevation sector of another antenna of said multiplicity of antennas whereby continuous suveillance of said total elevation angular coverage is achieved in operation.

4. A radar system in accordance with claims 1, 2, or 3 wherein said synchronizing means comprises delay means coupled between said receiver means and said identification generator means to affect video displays consistent with the temporal azimuthal angular displacement between antennas of said multiplicity of antennas.

5. A radar system in accordance with claim 4 further including:

means coupled to said receiver means for processing video signals derived from designated target echo signals to determine positional information of said designated targets; and means coupled between said positional information determining means and said radar indicating means for receiving, tracking, and providing identification symbols for said positional information of each of said designated targets whereby video signals representative of the present position of said designated target are coupled to said radar indicator means and displayed with a symbol identifying said designated target.

6. A radar system in accordance with claim 4 wherein said multiplicity of antennas comprises two antennas, each coupled to an associated receiver, elevation scannably mounted back-to-back on an azimuthal rotatable mount, and said synchronizing means therefor comprise video delay means coupled between one of said receivers and said identification generator means.

* * * * *